(12) United States Patent
Sokolov et al.

(10) Patent No.: US 8,883,042 B2
(45) Date of Patent: Nov. 11, 2014

(54) PRODUCTION OF GRAPHENE SHEETS AND FEATURES VIA LASER PROCESSING OF GRAPHITE OXIDE/ GRAPHENE OXIDE

(75) Inventors: Denis Aleksandrovich Sokolov, Atlanta, GA (US); Kristin Rene Shepperd, Conyers, GA (US); Thomas Michael Orlando, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/970,750

(22) Filed: Dec. 16, 2010

(65) Prior Publication Data

US 2011/0318257 A1 Dec. 29, 2011

Related U.S. Application Data

(60) Provisional application No. 61/286,947, filed on Dec. 16, 2009.

(51) Int. Cl.
| | |
|---|---|
| *C04B 14/00* | (2006.01) |
| *B82Y 40/00* | (2011.01) |
| *B82Y 30/00* | (2011.01) |
| *C01B 31/04* | (2006.01) |

(52) U.S. Cl.
CPC ............... *B82Y 40/00* (2013.01); *B82Y 30/00* (2013.01); *C01B 31/0476* (2013.01)
USPC ..................... 252/378 R; 423/460; 422/186

(58) Field of Classification Search
USPC ........... 423/445 R, 460; 252/378 R; 422/186; 204/157.61
See application file for complete search history.

(56) References Cited

U.S. PATENT DOCUMENTS

2009/0235721 A1* 9/2009 Robinson et al. ............ 73/31.05

OTHER PUBLICATIONS

Y. Zhou, et al. "Microstructuring of Graphene Oxide Nanosheets Using Direct Laser Writing" Advanced Materials vol. 22, Issue 1, Article first published online: Sep. 3, 2009.*
Langmuir-Blodgett Assembly of Graphite Oxide Single Layers Laura J. Cote, Franklin Kim, and Jiaxing Huang Journal of the American Chemical Society 2009 131 (3), 1043-1049.*
Four-Terminal Magneto-Transport in Graphene p-n Junctions Created by Spatially Selective Doping Timm Lohmann, Klaus von Klitzing, and Jurgen H. Smet Nano Letters 2009 9 (5), 1973-1979.*
Schniepp, Hannes C., et al. "Functionalized single graphene sheets derived from splitting graphite oxide." The Journal of Physical Chemistry B 110.17 (2006): 8535-8539.*

(Continued)

*Primary Examiner* — Richard M Rump
(74) *Attorney, Agent, or Firm* — Troutman Sanders LLP; Ryan A. Schneider; Troy S. Kleckley

(57) ABSTRACT

Graphene production using a continuous or pulsed laser beam focused on a substrate of graphite oxide in a significantly inert environment is disclosed. Laser-induced graphene features are characterized by a 2D-band in the Raman spectra. When the photons of the laser at a various frequencies and power levels beam impinge a graphite oxide foil for various amounts of time, a strip, divet, trench, or hole, having graphene at the bottom or sides is produced. The concentration of the graphite oxide and the laser beam may be adjusted so that the depth of the trench created is a certain depth less than the thickness of the foil. Additionally, in some embodiments, the evaporation of the water during the Hummers method is adjusted so that there remains interlaminar water in the graphite oxide foil. The presently disclosed subject matter may also be used in patterning using rastering or substrate motion.

19 Claims, 8 Drawing Sheets

(56) References Cited

OTHER PUBLICATIONS

Ferrari, A.C. et al., "Raman Spectrum of Graphene and Graphene Layers", Physical Review Letters, 2006, vol. 97, No. 18, pp. 187401-1-187401-4.

Ferrari, A.C., "Raman Spectroscopy of Graphene and Graphite: Disorder, Electron-Phonon Coupling, Doping and Nonadiabatic Effects", Solid State Communications, 2007, vol. 143, Nos. 1-2, pp. 47-57.

Stankovich, Sasha et al., "Synthesis of Graphene-Based Nanosheets Via Chemical Reduction of Exfoliated Graphite Oxide", Carbon, 2007, vol. 45, No. 7, pp. 1558-1565.

Wei, Zhongqing et al., "Nanoscale Tunable Reduction of Graphene Oxide for Graphene Electronics", Science, 2010, vol. 328, No. 5984, pp. 1373-1376.

Sokolov, Denis A. et al., "Formation of Graphene Features from Direct Laser-Induced Reduction of Graphite Oxide", The Journal of Physical Chemistry Letters, 2010, vol. 1, pp. 2633-2636.

Jorio, A. et al., "Raman Spectroscopy in Graphene Related Systems", Wiley-VCHVerlag GmbH & Co. KGaA, 2011, 359 Pages.

Eswaraiah, Varrla et al., "Top Down Method for Synthesis of Highly Conducting Graphene by Exfoliation of Graphite Oxide Using Focused Solar Radiation", Journal of Materials Chemistry, 2011, vol. 21, pp. 6800-6803.

Kim, Kwanpyo et al., "Raman Spectroscopy Study of Rotated Double-layer Graphene: Misorientation-angle Dependence of Electronic Structure", Physical Review Letters, 2012, vol. 108, No. 24, pp. 246103-1-246103-6.

Eckmann, Axel et al., "Probing the Nature of Defects in Graphene by Raman Spectroscopy", Nano Letters, 2012, vol. 12, No. 8, pp. 3925-3930.

Ghosh, Titisa et al., "Solution-Processed Graphite Membrane from Reassembled Graphene Oxide", Chemistry of Materials, 2012, vol. 24, No. 3, pp. 594-599.

Sokolov, Denis A. et al., "Excimer Laser Reduction and Patterning of Graphite Oxide", Carbon, 2013, vol. 53, pp. 81-89.

\* cited by examiner

PRODUCTION OF GRAPHENE SHEETS AND FEATURES VIA LASER PROCESSING OF GRAPHITE OXIDE/ GRAPHENE OXIDE

CROSS-REFERENCE TO RELATED APPLICATION

The present application claims the benefit of U.S. Provisional Patent Application Ser. No. 61/286,947, filed 16 Dec. 2009, the entire contents of which are incorporated herein as if fully set forth below.

STATEMENT REGARDING FEDERALLY SPONSORED RESEARCH

This invention was made with U.S. Government support under National Science Foundation Grant Number: DMR-0820382. The U.S. Government has certain rights in the invention.

TECHNICAL FIELD

The various embodiments relate generally to the production and patterning of graphene.

BACKGROUND

Graphene is typically defined to be a one-atom-thick, substantially planar sheet of $sp^2$ bonded carbon atoms. Because of the $sp^2$ bonding, the carbon atoms forming graphene are densely packed in a honeycomb crystalline lattice. Because of its electrical properties, graphene is being investigated as a possible replacement for silicon in electronic devices. There are several methods of forming graphene, including the drawing method (generally called micromechanical exfoliation or the Scotch tape method), epitaxial growth on silicon carbide, epitaxial growth on metal substrates, graphite oxide reduction, growth from metal-carbon melts, pyrolysis of sodium ethoxide, and through production from nanotubes.

BRIEF SUMMARY

The subject matter provided herein discloses a way to produce graphene using a continuous or pulsed laser beam, in both focused and unfocused conditions, on a substrate of graphite oxide in an inert environment. It should be noted that although the presently disclosed subject matter may make specific reference to graphite oxide, depending on the thickness of the oxide, the same material may also be termed graphene oxide. The presently disclosed subject matter, unless specifically stated otherwise, is not limited to any particular thickness of oxide that would be termed, depending on the thickness, graphite oxide or graphene oxide. Thus, as used in the presently disclosed subject matter, graphite oxide and graphene oxide may be used interchangeably unless otherwise specified.

The laser-induced graphene features are characterized by the presence of a 2D-band in the Raman spectra. Using a form of the Hummers method of preparing graphite oxide sheets, the concentration of graphite oxide is adjusted to provide for a foil having a certain thickness when partially or fully dried. When the photons of the laser at a various frequencies and power levels impinge the graphite oxide foil for various amounts of time, a dived, strip, trench, or hole, having graphene at the bottom and edges is produced. The presently disclosed subject matter is not limited to any one particular type of deformation caused by the exposure to create graphene. The terms dived, strip, trench and hole may be used interchangeably unless otherwise specified. In some embodiments, the concentration of the graphite oxide and the laser beam is adjusted so that the depth of the strip or trench created is a certain depth less than the thickness of the graphite oxide foil. Additionally, in some embodiments, the evaporation of the water during the Hummers method is adjusted so that there remains interlaminar water in the graphite oxide foil.

In one example, a method of producing graphene is disclosed. A graphite oxide substrate is prepared by exfoliating a plurality of graphene oxide sheets in an aqueous solution, neutralizing the aqueous solution to produce neutralized aqueous solution, centrifuging the neutralized aqueous solution, and allowing at least a portion of the water in the aqueous solution to evaporate or spin coating the aqueous solution on a material to provide for the graphite oxide substrate having a substrate depth. The graphite oxide substrate is then placed in an inert, gaseous environment and an area of the graphite oxide substrate is exposed to a laser beam to create a trench of graphene having a trench depth.

In another example, a system for producing graphene is disclosed. In some embodiments, the system has a laser source configured to provide a laser beam, graphite oxide substrate produced by exfoliating a plurality of graphene oxide sheets in an aqueous solution, neutralizing the aqueous solution to produce neutralized aqueous solution, centrifuging the neutralized aqueous solution, and allowing at least a portion of the water in the aqueous solution to evaporate or spin coating the aqueous solution on a material to provide for the graphite oxide substrate having a substrate depth. The system further has an inert gaseous environment provided by a gas flow cell having a gaseous inlet and a gaseous out, wherein the graphite oxide substrate is disposed within the inert gaseous environment, wherein an area of the graphite oxide substrate is exposed to the laser beam to create a graphene trench having a trench depth.

Another example for producing graphene is disclosed. In some embodiments, the light of the laser is focused into an inert gas mixture surrounding graphite oxide. Focusing the laser light in these mixtures before it interacts with the surface can produce extreme ultraviolet light by a process known as harmonic generation. This light can be used to pattern features less than 100 nm. For example, the use of a focused laser in Xe at 355 nm generates 118 nm and the use of Ar produces 89 nm light. Mixtures may increase the wavelength range and conversion efficiency.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE FIGURES

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

Figure 1:
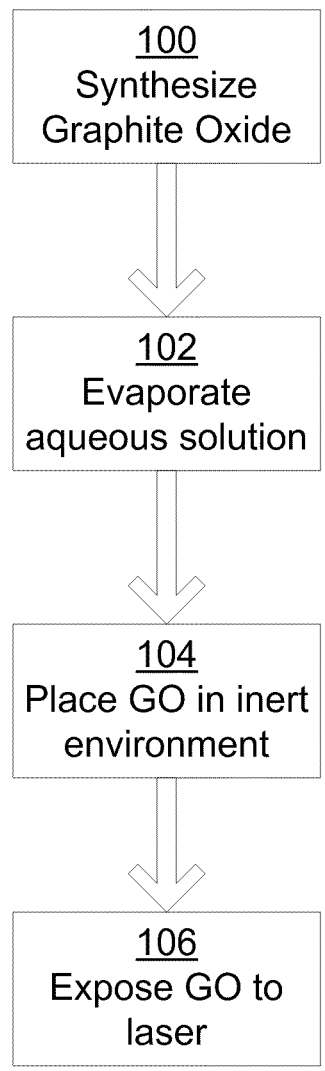
FIG. 1 is an exemplary and non-limiting method for producing graphene.

Any headings provided herein are for convenience only and do not necessarily affect the scope or meaning of the claimed presently disclosed subject matter.

DETAILED DESCRIPTION

The subject matter of the various embodiments is described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly required. It should be understood that the explanations illustrating data or signal flows are only exemplary. The following description is illustrative and non-limiting to any one aspect.

It should also be noted that, as used in the specification and the appended claims, the singular forms "a," "an" and "the" include plural references unless the context clearly dictates otherwise. For example, reference to an ingredient is intended also to include composition of a plurality of ingredients. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

In an exemplary embodiment of the presently disclosed subject matter, graphene features are produced via continuous-wave (e.g. 532 nm) or pulsed (e.g. 532 and 355 nm) laser excitation of graphite-oxide. It should be noted that these wavelengths are merely exemplary and non-limiting examples. Other wavelengths may be used depending on the power density of the light. Less power is needed as you move to the shorter wavelengths. The shorter wavelengths are desirable since one may be able to get diffraction limited features. In some embodiments, it may be possible to achieve this with near field optics to overcome a diffraction limit. Micro-Raman spectroscopy of these laser irradiated areas reveals D- and G-bands on the edges and 2D-bands characteristic of graphene in the central laser irradiated zones. $I_D/I_{2D}$ ratios vary with laser power and background gas. An $I_D/I_{2D}$ ratio of ~0.17 is obtained using continuous-wave excitation in $N_2$ background indicating a dominance of graphene optical signatures. The $I_D/I_G$ ratio obtained for the same region indicates a particle size or interdefect distance of ~40 nm. This technique could be useful for laser or lithographic patterning of graphene features.

An exemplary precursor for graphene is graphite oxide. Graphite oxide is an oxidized form of graphite which can be readily exfoliated in water to form monolayers known as graphene oxide (collectively "GO"). Although the exact chemical structure of graphite oxide is still debated, several experimental studies confirm the presence of hydroxyl and epoxy groups in the basal plane and a variety of alkyl and oxygen-containing functional groups terminating the edges. These chemical modifications cause local $sp^2$ to $sp^3$ hybridization changes and the formation of a band-gap. For O/C>0.5, gap energies between ~2.5-4 eV have been calculated using a local density approximation.

Disclosed herein is a technique to produce graphene features from direct laser irradiation of graphite oxide using either continuous wave or pulsed laser irradiation in an $N_2$ atmosphere. Typically, the reduction can be performed either in air or in any inert gas, but, in some examples, inert gas may be preferred because of an increased quality of materials produced. Additionally, as discussed below, a reactive gas may be added to the gaseous environment around the graphite oxide to provide for laser doping of the produced graphene.

These laser-induced graphene features may be characterized by the presence of a distinct 2D-band in the Raman spectra. This can be fit with a single Lorentzian and is very similar to that observed for single layer exfoliated graphene (EG) and epitaxial graphene.

Referring to the method illustrate in FIG. 1, graphite oxide is synthesized 100. Although there may be various ways to synthesize GO, an exemplary and non-limiting way is to use Hummers method in which a concentrated aqueous solution of graphite oxide was used. In the present example, GO foil was produced by allowing the aqueous solution to evaporate 102 on a glass substrate in an oven at ~110° C. It should be noted that in some embodiments, there may remain after evaporation trapped interlaminar water. In the present example, the dried GO foil sample was suspended between two pieces of carbon tape adhesive, assuring the samples never contacted the underlying glass microscope slide.

In some embodiments, the concentrated aqueous solution is centrifuged prior to evaporation. Prior to exposure to a laser, the GO foil, or graphite oxide substrate, is placed in an inert environment. For example, the GO foil may be placed under an $N_2$ blanket. In another example, the inert environment may also contain other gases that provide for the doping of the graphene to create graphene having n- or p-type characteristics. In other examples, the graphite oxide (or, as stated earlier, graphene oxide) may be reduced in an environment of liquid or gaseous hydrocarbons such as, but not limited to, methane and methanol. In some examples, this environment may be used to increase the quality of the produced graphene.

The GO foil is then exposed 106 to a laser. In an example, a continuous wave approach for graphene production was utilized using a Raman microscope 532 nm diode laser. In this example, the laser (20 mW) was focused on the GO foil sample using a 20× objective for a 1 second exposure time. Graphene formation using pulsed (~9 ns, 20 Hz) irradiation was carried out using the frequency doubled (532 nm) and tripled (355 nm) outputs of a Nd:YAG laser. As with the continuous wave measurements, the GO foil was suspended between two pieces of carbon tape. In this example, the unfocused laser beams irradiated the GO foil for approximately 20 seconds with typical energies of a few mJ/pulse or total power densities in the $MW/cm^2$ regime. It should be noted that other types of laser sources can be used.

Figures 2A, 2B:
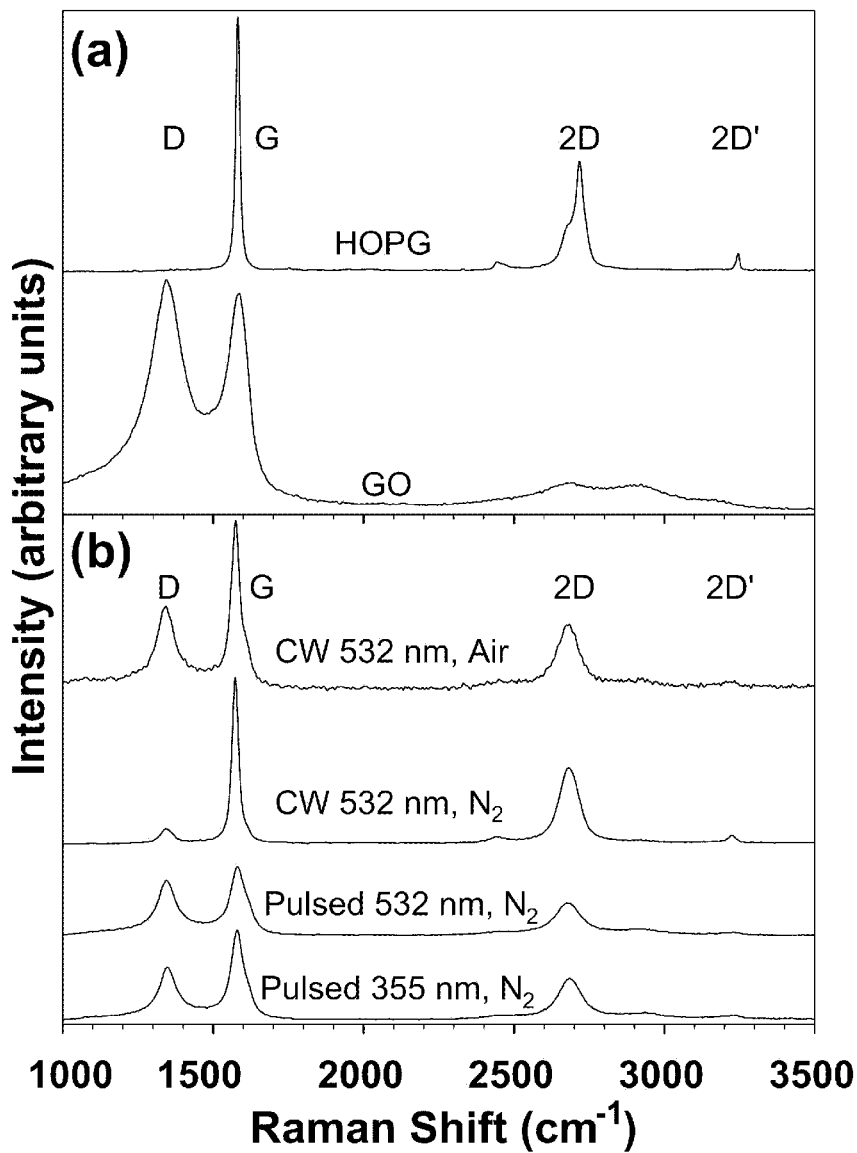
FIGS. 2a and 2b are Raman Spectra showing peaks at the 2D point illustrating the production of graphene.

To probe the laser-impact area, a Raman microscope laser power was set at 2 mW. At this low level, laser-induced reduction/damage of the GO surface is negligible. For the sake of comparison, a micro-Raman spectral signatures from highly oriented pyrolytic graphite (HOPG) was obtained. These are shown in FIG. 2a. Two major peaks are assigned to the G mode (~1590 $cm^{-1}$) and the 2D (often referred to as G') mode (~2720 $cm^{-1}$). The G mode is the in-plane vibration of the C atom $sp^2$ network. This one phonon process involves $E_{2g}$ optical phonons near the $\Gamma$ point. The 2D mode results from a two-phonon resonant scattering process and is normally considered an overtone of the defect mediated D-band. Though the D-band is not present in HOPG and defect free samples, the 2D feature is always observed with widths defined by the thickness and stacking order along the c-axis. For single layer graphene, a single Lorenztian line shape centered at 2690 $cm^{-1}$ can indicate electronic structure that is dominated by Dirac-Weyl dispersion. It is therefore accepted as one of better optical signatures regarding the presence of graphene.

The micro-Raman spectrum of GO is also shown in FIG. 2a. It is different than that from HOPG. Specifically: i) the G-band is much broader and blue shifted (~5-10 $cm^{-1}$); ii) there is a strong D-band at 1345 $cm^{-1}$; and iii) the 2D-band is nearly absent. These changes are correlated with structural changes and defects associated with the hydroxyl and epoxy groups in the basal plane and a variety of alkyl and oxygen-containing functional groups terminating the edges.

FIG. 2b shows the micro-Raman spectrum of GO foil irradiated with a CW 532 nm beam in the presence of ambient air. The 2D-band is observed and there is a narrowing of the G-band as well as diminution of the D-band. When using $N_2$ background gas, the 2D-band is further enhanced, the G-band is much narrower and the D-band is nearly removed. FIG. 2b also shows the Raman spectra of GO foil irradiated with pulsed 532 and 355 nm photons in $N_2$ background. Formation of the 2D-band and G-band narrowing also occurs. However, the D-band feature, though reduced relative to untreated GO, remains independent of the laser flux. This indicates an intrinsic difference in the defect density and material quality relative to that formed using CW excitation.

Figure 3:
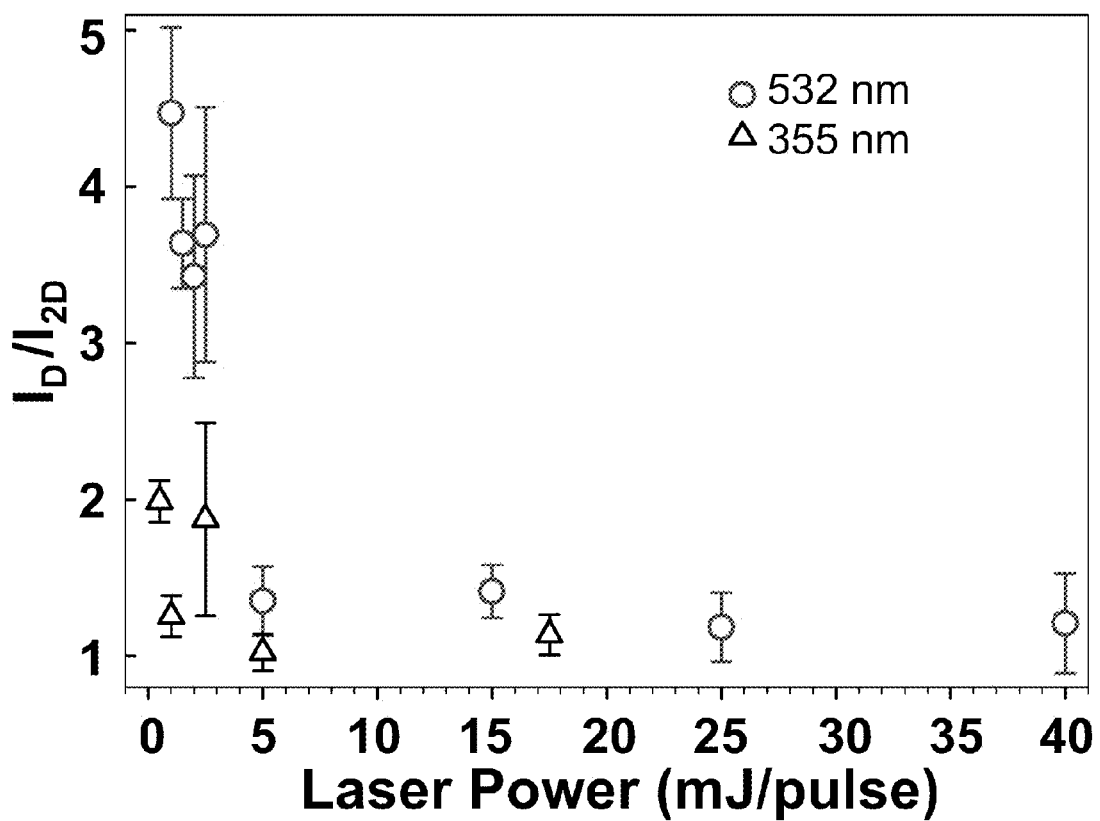
FIG. 3 shows the integrated $I_D/I_{2D}$ ratio as a function of 532 nm and 355 nm pulsed power.

FIG. 3 displays integrated D and 2D peak intensity ratios ($I_D/I_{2D}$) as a function of laser pulse power for 355 and 532 nm. When using 355 nm photons, the 2D-band is produced at the lowest powers and the ($I_D/I_{2D}$) ratio is about 1.0-2.0. Though sample surface non-uniformity causes variability, this ratio remains close to 1.0 even at the highest power. On the contrary, the $I_D/I_{2D}$ ratio is usually dependent on the power when using 532 nm photons and discernable 2D-band features are not evident until ~5 mJ/pulses. The 355 nm light excites single-photon mediated valence-to-conduction band transitions. This produces electron-hole plasmas in the material at all pulse energies studied. Since at least two 532 nm photons are required to exceed the band-gap, a coherent multiphoton or incoherent multiple photon process may be required to create a similar electron-hole plasma. This is consistent with the 532 nm 2D-band formation threshold of 2.8 $MW/cm^2$ which is below the pre-ablation threshold of graphite.

Without being held to any specific theory of operation, it is believed that the mechanisms of laser desorption and ablation according to embodiments of the presently disclosed subject matter can be dominated by electronic and/or thermal processes with the partitioning governed by the degree of energy localization. Though electron-lattice temperature equilibration occurs on the picosecond time scale in graphite, strain associated with the oxygen in GO can lead to exciton self-trapping, hole localization and subsequent material removal. Depending upon the density of electrons, ions and neutrals emitted, one can create a plasma plume which must expand as it leaves the surface.

In some experiments, an enhanced scattered light intensity during laser irradiation of the GO surface occurs. This may result from particle and plasma mediated photon scattering and fluorescence. The output CO and $CO_2$ as well as the release of $H_2O$ during laser irradiation has been observed in some experiments. The release of high mass (up to 100 amu) carbon cluster ions during photon- and low-energy (5-50 eV) electron-stimulated desorption studies of GO has also been observed in some experiments. Previous work on laser desorption/ablation of carbon and graphite demonstrates the direct removal of nanoscale graphene sheets. Clustering reactions within the plume are also known to form higher mass $sp^2$ hybridized carbon products. Under the atmospheric pressure conditions utilized in some experiments according to various embodiments of the presently disclosed subject matter, these products can be deposited on the surface and serve as seeds for growth of larger graphene particles or sheets.

The D-band persistence and 2D-band growth after laser treatment is consistent with laser-induced plasma formation and graphene-like material re-deposition/growth. To examine the mean domain/particle size(s) or interdefect distances, the empirical relationship: $L_a(nm) = (2.4 \times 10^{-10}) \lambda^4 (I_D/I_G)^{-1}$ where $\lambda$ is the laser wavelength (nm) and $I_D$ and $I_G$ are the integrated Raman intensities may be used. The data in FIG. 3 shows a ~40 nm lower bound for the mean value of $L_a$. Since $L_a$ may also refer to the interdefect distance, it can also be considered an indicator of order.

Since electron-phonon coupling within a graphite oxide sheet is also strong, rapid local heating causes temperatures to exceed that required for oxidative disruption of the GO foil lattice. This can be the source for production and release of CO and $CO_2$. Heat dissipation can also occur by heating and vaporizing the interlaminar water creating high internal pressures between the graphene oxide sheets. Efficient material removal may then occur via rapid degassing and quasi-phase explosion of the superheated underlying layers. Without being bound to any specific theory of operation, this is consistent with the observation of water release and the SEM image in FIG. 4a.

Figures 4A, 4B:
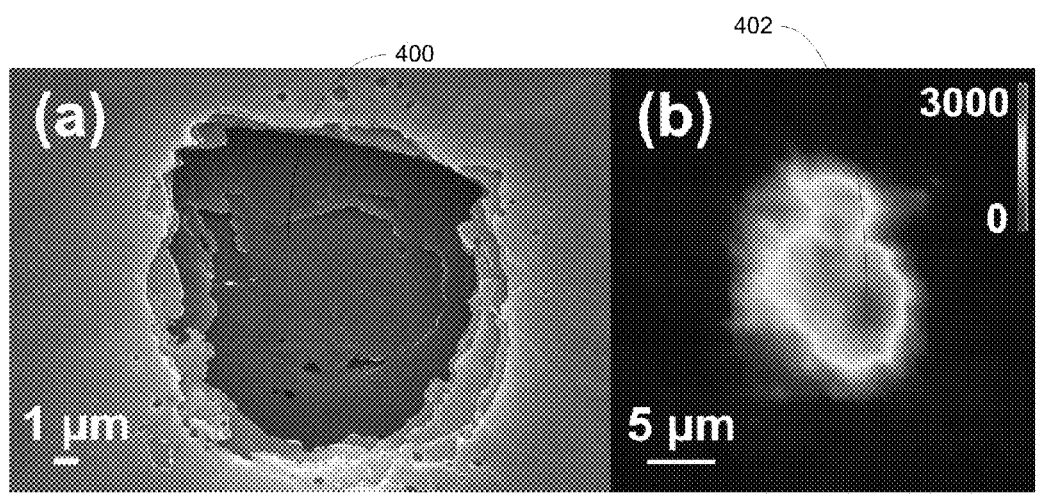
FIG. 4a is a scanning electron microscope image of a graphene trench, or depression.
FIG. 4b is a spatially resolved map of the Raman 2D-band.

FIG. 4a shows a 10 μm wide×5 μm deep depression, or trench 400, formed by 532 nm CW irradiation of GO foil, or substrate. Inspection indicates: i) the depth is self-limiting, ii) the edges outwardly expand, and iii) there is little to no evidence of melt zones or substantial particle/material build-up near the edges. This feature has been mapped with the micro-Raman spectrometer and has been found that the D-band is present mainly at the edges. Conversely, the 2D feature is present mainly in the depression, trench 402, center as shown in FIG. 4b. This is consistent with explosive removal followed by re-deposition and growth.

Figure 5:
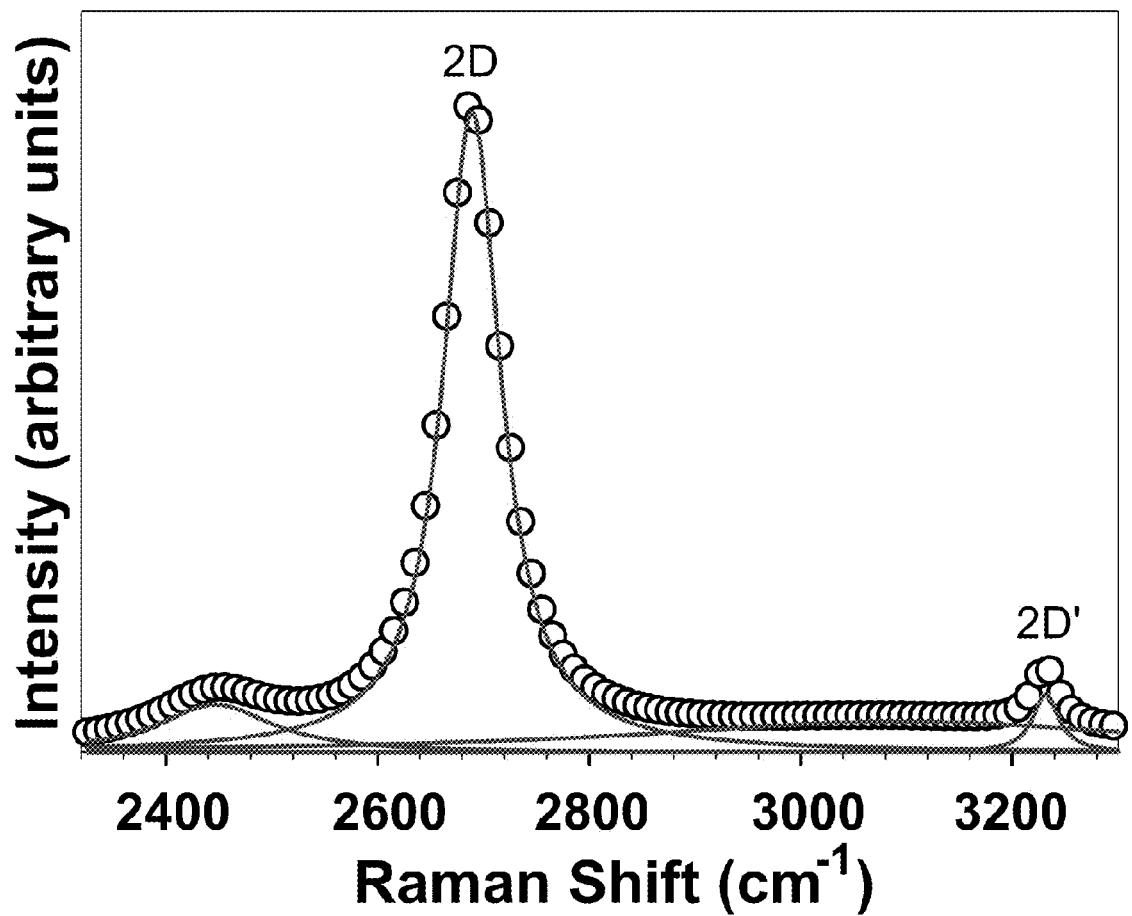
FIG. 5 is an illustration of the Raman Shift measured in a graphene trench, or depression.

Since the width of the 2D feature in FIG. 4b may yield valuable information regarding the graphene thickness, FIG. 5 shows a detailed view of the measured 2D-band. The primary peak can be fit with a single Lorentzian with a full width at half maximum (FWHM) of 65 cm$^{-1}$. A similar but narrower (FWHM ~30 cm$^{-1}$) feature has been observed for mechanically exfoliated graphene supported on a $SiO_2$ surface. The exfoliated graphene bilayer displays a broader 2D feature which cannot be fit to a single Lorentzian. However, the 2D feature of bilayer graphene epitaxially grown on Si-terminated 6H—SiC(0001) can be described using a single Lorentzian with a FWHM of 47 cm$^{-1}$.

The peak shift and increased width (relative to the monolayer of exfoliated graphene) has been partially correlated with compressive strain of the graphene. Reported measurements of the 2D-band width/shift together with scanning tunneling microscopy of bilayer graphene on Si-terminated 6H—SiC(0001) also lead to the conclusion that domains of about 35 nm were present. The observed widths and positions are likely indicative of a thicker sample that has undergone strain.

Figure 6:
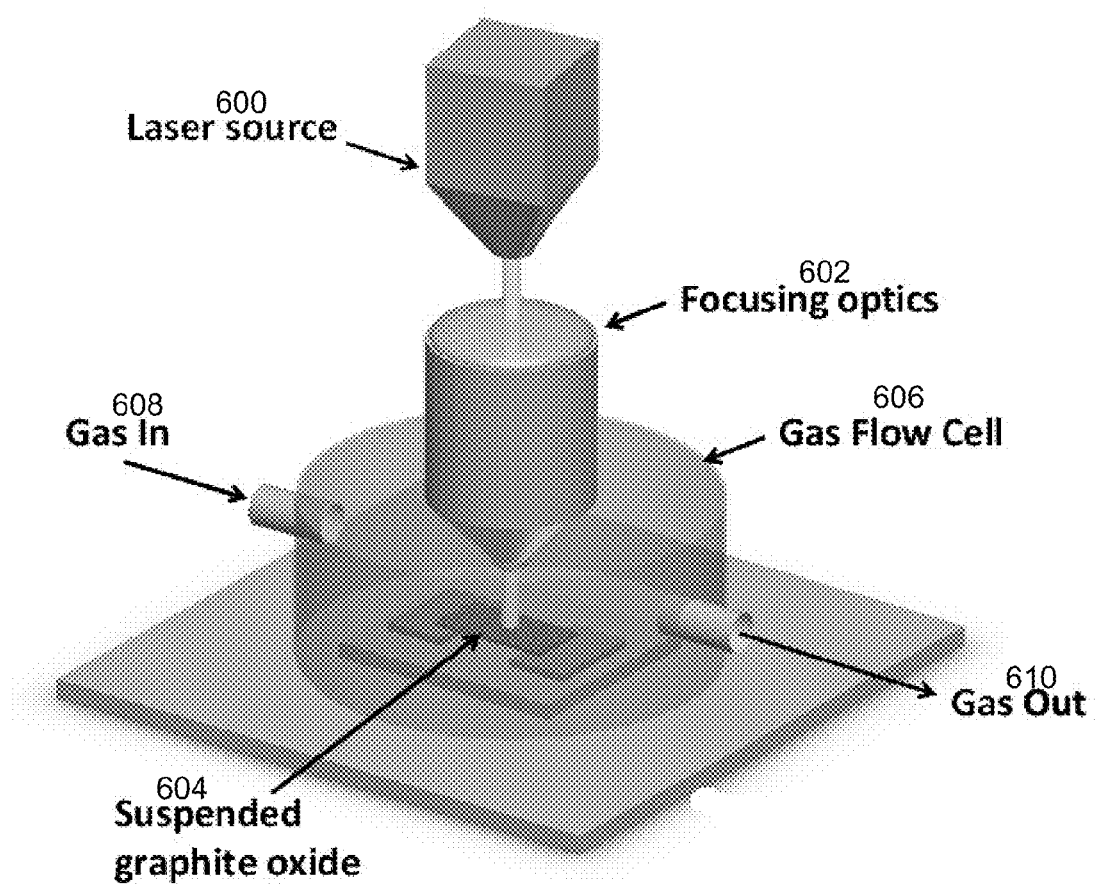
FIG. 6 is an exemplary and non-limiting system for producing graphene.

FIG. 6 is an exemplary and non-limiting system that may be used to produce graphene. Laser source 600 provides a laser beam for exposing a suspended graphite oxide GO. In some examples, GO 604 may be produced by the method as described in relation to FIG. 1. The laser beam of laser source 600 may be focused to change the characteristics of the laser when GO 604 is exposed. For example, to achieve certain trench dimensions, the laser beam may be focused using focusing optics 602 to produce a very narrow beam. If a larger area of the GO is to be exposed for a single "pass", the laser may be less focused to have a larger area of exposure. The laser beam may also be rasterized to create various patterns. In another example, the depth of the graphene trench created after exposure may be adjusted by adjusted the parameters of the laser beam. For example, it may be desirable to create a graphene trench having a depth less than the thickness of GO 604. In other examples, it may be desirable to create a graphene trench having a depth of about one half to three quarters the thickness of GO 604.

Prior to exposing GO 604 to the laser beam of laser source 600, GO 604 may be placed in gas flow cell 606 which provides for an inert gaseous environment surrounding GO 604. The inert gaseous environment of gas flow cell 606 is provided by controlling the gases entering gas in 608 and gas out 610. In one example, the gas used may be comprised primarily of $N_2$. In another example, it may be desirable to cause the graphene produced to be doped to have n- or p-type characteristics. In that example, in addition to another inert gas, such as $N_2$, it may be desirable to input a gas that causes doping of the graphene in conjunction with its creation.

There are also different embodiments for controlling the background gas and for removing the laser-induced plume. One such configuration is via a capillary tube or waveguide filled with rare gases for laser delivery. When using Xe in the tube and 355 nm light, you can frequency convert the light to 118 nm. You can also seed the gases with Ne and hydrogen to generate Lyman-alpha photons (121.6 nm). These higher energy photons may be rather efficient in material removal. Without being held to any specific theory of operation, it is possible that this action is driven by a localized plasma. The laser may be the "ignition" source of the plasma. The laser can also ignite a plasma within the capillary tube vs. at the surface of or within the graphite oxide. Biasing the graphite oxide substrate and controlling the local fields with a magnetic base/material may also be useful since the plasma parameters will change somewhat.

Figure 7:
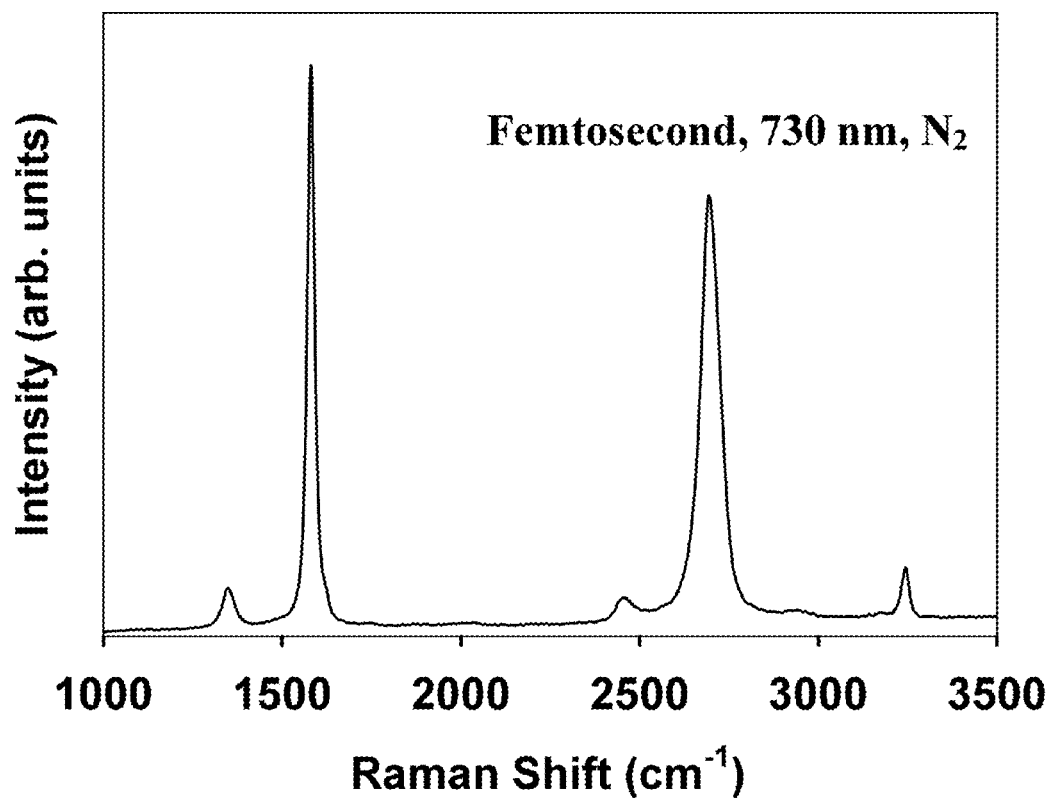
FIG. 7 is a Raman Spectra showing peaks at the 2D point illustrating the production of graphene using a femtosecond, 730 nm laser.
Figure 8:
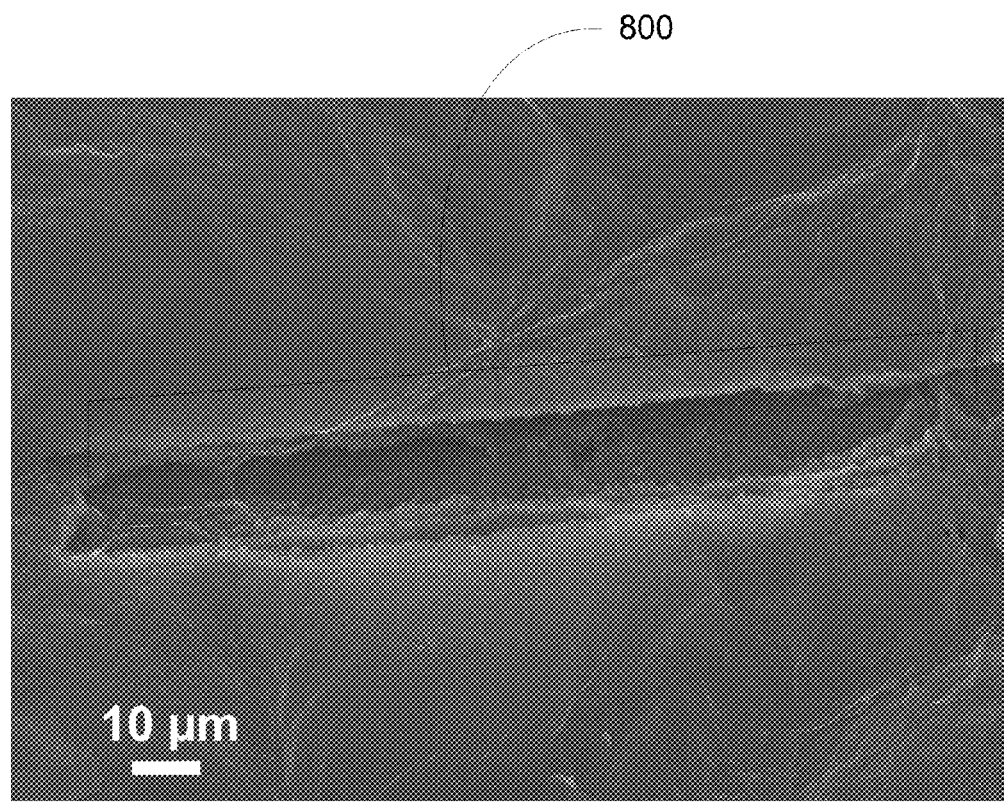
FIG. 8 is scanning electron microscope image of a trench produced using a femtosecond laser.

Further, the presently disclosed subject matter is not limited to continuous wave and nanosecond laser pulses. In some examples, shorter then nanosecond laser pulses can be used. In one example, shown with reference to FIG. 7, a femtosecond laser source with 730 nm wavelength laser excitation may be used for the reduction of graphite oxide. FIG. 7 shows the Raman Spectra measured when GO foil was exposed, according to various embodiments of the presently disclosed subject matter, to a femtosecond laser having a wavelength of 730 nm. FIG. 8 is an exemplary scanning electron microscope image of a trench 800 produced using a femtosecond laser source. It should be noted that the area of the trench identified is for illustrative purposes only.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims

What is claimed is:
1. A method of producing graphene, comprising:
   preparing a graphite oxide substrate by:
      exfoliating a plurality of graphene oxide sheets in an aqueous solution;
      neutralizing the aqueous solution to produce neutralized aqueous solution;
      centrifuging the neutralized aqueous solution; and
      allowing at least a portion of the water in the aqueous solution to evaporate or spin coating the aqueous solution on a material to provide for the graphite oxide substrate having a substrate depth;
   placing the graphite oxide substrate in an inert gaseous environment; and
   exposing an area of the graphite oxide substrate to a laser beam that produces ultraviolet and vacuum ultraviolet photons to reduce the graphite oxide by electronic excitations while in the inert gaseous environment to create graphene,
   wherein the inert gaseous environment comprises a rare gas or hydrogen.
2. The method of claim 1, wherein the inert gaseous environment further comprises nitrogen.
3. The method of claim 2, wherein the inert gaseous environment further comprises a dopant to provide for an n- or p-type graphene characterization.
4. The method of claim 1, wherein the laser beam is from a pulsed laser source or a continuous wave laser source.
5. The method of claim 1, wherein the wavelength of the laser beam is 532 nm or 355 nm.

6. The method of claim 1, wherein the area of the graphite oxide substrate is exposed for approximately 3 seconds to approximately 30 seconds.

7. The method of claim 1, wherein the laser beam is rasterized.

8. The method of claim 1, wherein the laser beam is focused or unfocused.

9. The method of claim 1, wherein the dried exfoliated graphene oxide sheets comprise interlaminar water.

10. The method of claim 1, wherein the rare gas is selected from the group consisting of argon, xenon and neon.

11. A system for producing graphene, comprising:
a laser source configured to provide a laser beam;
a graphite oxide substrate produced by:
  exfoliating a plurality of graphene oxide sheets in an aqueous solution;
  neutralizing the aqueous solution to produce neutralized aqueous solution;
  centrifuging the neutralized aqueous solution; and
  allowing at least a portion of the water in the aqueous solution to evaporate or spin coating the aqueous solution on a material to provide for the graphite oxide substrate having a substrate depth; and
an inert gaseous environment provided by a gas flow cell having a gaseous inlet and a gaseous out, wherein the graphite oxide substrate is disposed within the inert gaseous environment, wherein an area of the graphite oxide substrate is exposed to the laser beam, wherein the laser beam produces ultraviolet and vacuum ultraviolet photons that reduce the graphite oxide by electronic excitations to create graphene,
wherein the inert gaseous environment comprises a rare gas or hydrogen.

12. The system of claim 11, wherein the laser beam is rasterized.

13. The system of claim 11, wherein the laser beam is focused or unfocused.

14. The system of claim 11, wherein the laser beam is from a pulsed laser source or a continuous wave laser source.

15. The system of claim 11, wherein the area of the graphite oxide substrate is exposed for approximately 3 seconds to approximately 30 seconds.

16. The system of claim 11, wherein the wavelength of the laser is 532 nm or 355 nm.

17. The system of claim 11, wherein the inert gaseous environment comprises nitrogen.

18. The system of claim 11, wherein the inert gaseous environment further comprises a dopant to provide for an n- or p-type graphene characterization.

19. The system of claim 11, wherein the dried exfoliated graphene oxide sheets comprise interlaminar water.

* * * * *